March 30, 1926. 1,578,425
A. R. GOLDRICK
VEHICLE SPRING COVER
Filed March 15, 1923
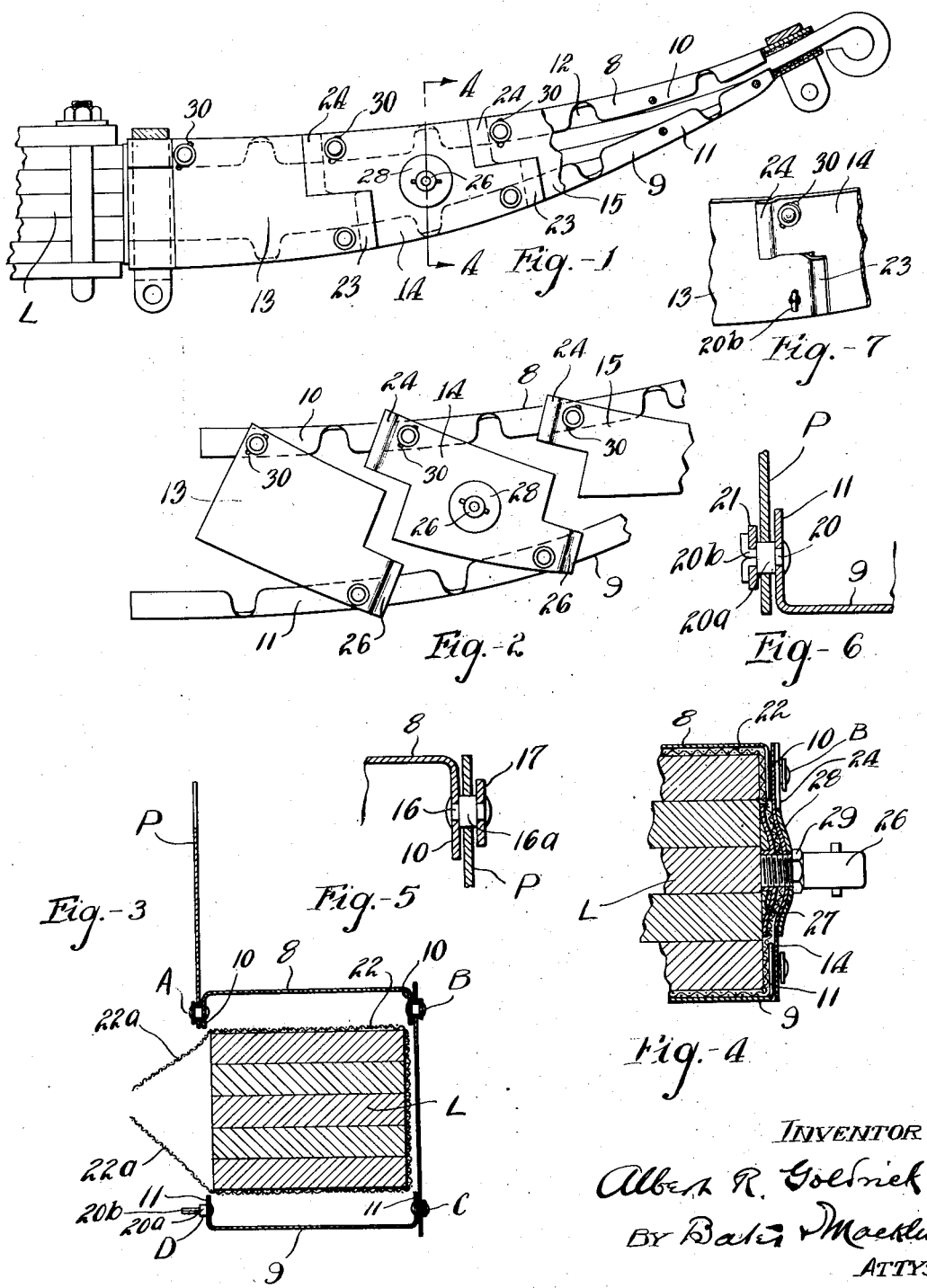
INVENTOR
Albert R. Goldrick
By Baker & Macklin
ATTYS.

Patented Mar. 30, 1926.

1,578,425

UNITED STATES PATENT OFFICE.

ALBERT R. GOLDRICK, OF CLEVELAND, OHIO, ASSIGNOR, BY MESNE ASSIGNMENTS, TO ALBERT E. HODGINS, OF CLEVELAND, OHIO.

VEHICLE SPRING COVER.

Application filed March 15, 1923. Serial No. 625,189.

*To all whom it may concern:*

Be it known that I, ALBERT R. GOLDRICK, a citizen of the United States, residing at Cleveland, in the county of Cuyahoga and State of Ohio, have invented a certain new and useful Improvement in a Vehicle Spring Cover, of which the following is a full, clear, and exact description, reference being had to the accompanying drawings.
This invention relates to vehicle spring covers such as are adapted for the reception of lubricant under pressure.

The general object of the present invention is the provision of a simple construction of an outer metallic casing for such a spring cover. More specifically, my invention is concerned with the novel arrangement of the metallic parts comprising the casing whereby an upper continuous strip and a lower continuous strip may be joined with relatively movable side plates to thereby surround four sides of the spring, the relation of the side members being such as to permit the relative longitudinal shifting and flexing of the top and bottom members.

Other objects will become apparent from the following description taken in connection with the accompanying drawings. The essential features are summarized in the claims.

In the drawings, Fig. 1 is a side elevational view of my improved cover as applied to an automobile spring; Fig. 2 is a fragmentary side elevation showing the manner of positioning the parts to permit the ready assembling of the casing upon a vehicle spring; Fig. 3 is a transverse cross sectional view taken through the vehicle spring and a cover illustrating the manner of placing the cover over the spring; Fig. 4 is a cross sectional view taken substantially along the line 4—4 in Fig. 1; Fig. 5 is a fragmentary view showing the construction of pivotal joint between one of the side members and the top member; Fig. 6 is a similar view showing a similar construction between the bottom member and one of the side members; Fig. 7 is a perspective view showing the co-active relation of the adjacent edges of the plates.

Among the commercial requirements of a successful spring cover are, that the cover shall have the essential characteristics of easy flexibility and strength to resist internal pressures, the proper joining of the respective parts of the cover to withstand great shocks and sudden flexings, and the respective parts comprising the cover must be so arranged that the cover may be readily assembled or attached to the vehicle springs without removing the spring from the vehicle.

To coordinate the foregoing characteristics in the construction of a spring cover, I have arranged the metallic casing thereof as shown in Fig. 1 which may comprise an upper flat member 8 extending longitudinally of the spring and superposed along the top leaf thereof, and a bottom member 9 having similar characteristics, positioned along the bottom of the spring and extending over the ends of the respective laminations or leaves comprising the spring. The top and bottom members are provided with side flanges 10 and 11 and suitably notched as indicated at 12 and 13 respectively, to permit the flexing of the top and bottom members when the spring is deflected without causing a buckling or distorting of the side flanges 10 and 11. The purpose of the side flanges is to provide connections for the relatively movable side plates 13, 14, 15, etc.

As shown in Fig. 2, the diagonally opposite corners of the side plates are pivotally and slidably connected to the flanges of the top and bottom members in slots 30 and this connection may comprise a series of shouldered rivet members A, B and C along both flanges of the top member and one flange of the bottom member. Each rivet 16 of these series may be rigidly secured to the flanges with an enlarged portion 16ª comprising the side plate pivots and also affording a shoulder for the abutment of a washer 17, the length of the enlarged rivet portion 16ª being slightly greater than the thickness of the side plates. Such a pivotal and slidable construction between the plates and flanges is serviceable for three corners of the spring and may be made permanent before the spring cover is assembled on the spring.

The fourth series of pivotal connections as indicated at D in Fig. 3 however, is slightly modified, whereby the plates comprising one side of the cover may be swung upwardly to permit the positioning of the cover upon the spring leaves by a simple slipping on movement from one side of the spring. As shown in Fig. 3, this positioning movement would be from the right of the spring leaves L to the left, the top and bottom members 8 and 9 having been previously drawn apart as shown in Fig. 2 to permit the flanges 10 and 11 to pass over the spring. The top and bottom members may then be brought into engagement with the spring as illustrated in Fig. 4. The plates P comprising the left side of the cover, may then be swung downwardly in the proper position and the fourth group of pivotal connections D may be made.

To expedite this final assembling of the cover upon the spring even by an unskilled workman, I provide a connection serving somewhat as a cotter pin. As shown in Fig. 6 this rivet member 20 has an enlarged body portion 20ª similar to the body portion 16ª of the rivet 16, but I prefer to split the outwardly projecting end 20ᵇ of this rivet, whereby a washer 21, positioned thereon after the blade P has been brought into engagement with the rivet, may be permanently held in position by the opening or spreading of the ends 20ᵇ. This spreading may be done with ordinary convenient tool. When open the split ends 20ᵇ engage the washer as shown in Fig. 6 and prevent its displacement thereafter. This arrangement likewise provides for the quick removal of the spring cover from the vehicle in the event it is necessary to replace a broken spring leaf, as the rivets 20 may be formed of very ductile metal to permit repeated bending or distorting.

I prefer to provide an inner fabric lining 22 which may be placed around the four sides of the spring leaves with longitudinal edges 22ª in overlapping relation. This fabric lining may be treated with graphite or other suitable material to make it impervious to lubricant forced therewithin.

To have the side plates properly resist the internal pressure when lubricant is forced therein, I arrange the adjacent ends of the side plates in the manner illustrated in Fig. 7. Here it will be noted an end portion 23 is upset an amount substantially equal to the thickness of the side plate and extends from the bottom edges of the plate adjacent its lower pivotal connection a distance substantially equal to half the height of the plate, the portion 23 extending over the disconnected corner of the adjacent plate 14. A corresponding upset portion 24 is formed along the edge of the plate 14 adjacent its upper pivotal connection which engages the disconnected upper half of the adjacent end of the plate 13. The upper pivotal connection of the plate 14 thus serves as a lateral stiffening means for the upper disconnected portion of the plate 13, while the lower pivotally connected end of the plate 13 serves in a similar manner to laterally strengthen the disconnected lower end of the plate 14. I arrange the adjacent ends of the respective plates in this manner whence all of the plates are supported at the four corners thereof and thus support the inner fabric lining when lubricant is present therein under pressure while at the same time permitting the greatest degree of relative movement of the respective plates and consequently the greatest degree of flexing movement of the spring cover.

As shown in Fig. 4, I provide means for affording communication from the exterior of the cover to the interior of the lubricant receiving lining 22, which may comprise coupling means for connecting lubricant pressure means such as a grease gun, which may be a lubricant receiving nipple 26 in threaded engagement with the washer member 27 disposed within the lining 22. I provide an outwardly disposed washer member 28 which may be engaged by a shoulder 29 of the lubricant nipple 26 whereby the washers 27 and 28 may act upon the lining and the side plate 14, to bring the plate and lining in clamped relation and thereby prevent the escape of lubricant.

From the foregoing description, it will be evident that I provide a very simple and efficient construction for a vehicle spring cover which may be economically produced and assembled upon vehicle springs, the relation of the movable parts being such as to prevent the ingress of dirt, dust and moisture, the whole being of such construction as to support an inner lubricant receiving lining throughout the length of the spring when lubricant is forced therein under pressure.

Having thus described my invention, I claim:—

1. In a vehicle spring cover of the character described, the combination of a top member extending substantially one-half the length of the spring, a bottom member similarly extending along the spring and interengaging relatively movable side members pivotally connected to the top and bottom members, the pivotal connections being in staggered relation, whereby said top member may shift longitudinally of the spring relative to said bottom member.

2. In a vehicle spring cover of the character described, the combination of a metallic strip extending along the top of the spring, a similar strip along the bottom of the spring, the sides of the cover comprising interengaging plates having diagonal corners attached respectively to the top and bottom members.

3. In a vehicle spring cover of the character described, a plurality of interengaging side plates having two diagonal corners thereof attached to the top and bottom portions of the spring cover.

4. In a vehicle spring cover of the character described, the combination of a plurality of relatively movable interengaging side plates connected to the top and bottom portions of the spring, the connections of the respective plates comprising pivots disposed diagonally at the corners of the side plates.

5. In a vehicle spring cover of the character described, the combination of a single metallic member extending along the top of the spring substantially half the length thereof, a similar member extending along the bottom thereof, said top and bottom members having downwardly and upwardly extending flanges respectively, a plurality of side members arranged to be interengaged whereby they may be relatively movable, and connecting members joining the side members to the flanges of the top and bottom members.

6. In a vehicle spring cover of the character described, the combination of a plurality of metallic strips extending longitudinally substantially half the length of the spring, and a plurality of relatively movable side members arranged to be interengaging and pivotally connected to said longitudinally extending members.

7. In a vehicle spring cover of the character described, the combination of a top and bottom member extending the half length of the spring and relatively movable side members pivotally connected to the top and bottom members.

8. In a vehicle spring cover of the character described, the combination of a metallic member extending along the top of the spring and having downwardly extending notched flanges arranged to embrace the sides of the spring leaves, a similarly formed bottom member, and articulated sides comprising a plurality of relatively movable plates having diagonal corners pivotally connected to the flanges of the top and bottom members respectively and having the adjacent edges thereof formed to overlap disconnected corners of adjacent plates.

9. A vehicle spring cover comprising a single member forming the top of the cover, a single member comprising the bottom of the cover, the sides of the cover being formed of a series of articulated plates movable relative to the top and bottom members.

10. In a vehicle spring cover of the character described, the combination of a single top member, a bottom member, and interengaging relatively movable side members connected to the top and bottom members.

11. In a vehicle spring cover of the character described, the combination of a metallic strip extending along the top of the spring, a similar strip along the bottom of the spring, and side walls comprising overlapping plates having two diagonal corners attached respectively to the top and bottom members.

12. In a vehicle spring cover of the character described having top and bottom members and a plurality of side plates having two diagonal corners thereof attached to top and bottom members of the spring cover.

13. In a vehicle spring cover of the character described, the combination of a flanged metallic member extending along the top of the spring, a similar member extending along the bottom thereof, a plurality of side members arranged to be relatively movable and connected to said flanges of the top and bottom members.

14. In a vehicle spring cover of the character described, the combination of a top and a bottom member extending longitudinally of the spring and side plates disposed in a common plane and constituting the side walls of the cover and connected to the top and bottom members.

15. A vehicle spring cover comprising a single member comprising the top of the cover, a single member comprising the bottom of the cover, the sides of the cover being formed of a series of relatively movable plates joined along the top and bottom margins thereof to the side margins of the top and bottom members respectively.

16. In a vehicle spring cover the combination of top and bottom flanged strips of metal and a plurality of relatively movable side members pivotally connected to the flanges of the strips.

17. In a vehicle spring cover the combination of a top and a bottom strip of metal and side walls comprising a plurality of relatively movable plates disposed to lie in a common plane.

18. In a vehicle spring cover the combination of a top and a bottom strip of metal and side walls comprising a plurality of relatively movable interengaging side plates disposed to lie in a substantially common plane.

In testimony whereof, I hereunto affix my signature.

ALBERT R. GOLDRICK.